United States Patent [19]

Gibbs et al.

[11] 4,273,901

[45] Jun. 16, 1981

[54] DISPERSIBLE VINYLIDENE CHLORIDE POLYMER MICROGEL POWDERS AS ADDITIVES FOR POLYMERS

[75] Inventors: Dale S. Gibbs; Jack H. Benson; Reet T. Fernandez, all of Midland, Mich.

[73] Assignee: The Dow Chemical Company, Midland, Mich.

[21] Appl. No.: 91,281

[22] Filed: Nov. 5, 1979

Related U.S. Application Data

[62] Division of Ser. No. 942,512, Sep. 15, 1978, Pat. No. 4,232,129.

[51] Int. Cl.$^3$ .......................... C08K 5/05; C08K 5/13; C08G 18/06
[52] U.S. Cl. ...................................... 525/455; 528/48; 260/33.4 UR
[58] Field of Search ................. 260/33.4 UR; 525/455

[56] References Cited

U.S. PATENT DOCUMENTS

| | | | |
|---|---|---|---|
| 3,317,450 | 5/1967 | Grenley et al. | 526/323.2 |
| 3,424,706 | 1/1969 | Smith et al. | 526/343 |
| 3,483,154 | 12/1969 | Gibbs | 526/329.4 |
| 3,916,060 | 10/1975 | Fish et al. | 428/303 |
| 4,186,259 | 1/1980 | Bush et al. | 526/343 |

FOREIGN PATENT DOCUMENTS 989911  4/1965  United Kingdom ............ 260/29.6 TA

*Primary Examiner*—Joseph L. Schofer
*Assistant Examiner*—Peter F. Kulkosky
*Attorney, Agent, or Firm*—R. B. Ingraham

[57] ABSTRACT

A crosslinked vinylidene chloride polymer microgel powder is recovered from a latex and dispersed with moderate shear in a nonsolvent for vinylidene chloride polymers, such as a polyol used in the preparation of polyurethane materials. A dispersion of the powder and a polyol is eminently suited for use in the preparation of polyurethane foams to impart enhanced flame-retardancy and load-bearing properties thereto.

3 Claims, No Drawings

DISPERSIBLE VINYLIDENE CHLORIDE POLYMER MICROGEL POWDERS AS ADDITIVES FOR POLYMERS

This is a divisional, of application Ser. No. 942,512, filed Sept. 15, 1978 now U.S. 4,232,129.

BACKGROUND OF THE INVENTION

The present invention relates to vinylidene chloride polymers and, more particularly to vinylidene chloride polymers which are dispersible in nonsolvents for such polymers.

Halogenated compounds, such as chlorinated polyethylenes, crosslinked copolymers of vinyl halides, bromophenols, vinylidene chloride polymers, and the like, have long been used as additives for polymeric materials to provide enhanced flame-retardancy. Typically, the object in this art has been to achieve such flame-retardancy without significantly decreasing other beneficial properties of the base polymeric material.

On the other hand, a great deal of art has also been developed on the incorporation of high molecular weight polymer additives in polymeric materials to enhance properties other than flame-retardancy. With respect to polyurethane foam materials in particular, it is known that the load-bearing properties can be improved by using additives such as aqueous elastomer latices, vinyl aromatic polymers, and film-forming polymers having radicals reactive with the isocyanate component of the foam. Generally, this art has required the use of a further additive to provide enhanced flame-retardancy.

It would be highly desirable to have a polymer additive which could be incorporated in polyurethane foam materials to provide both improved flame-retardancy and enhanced load-bearing properties.

Accordingly, it is a primary object of the present invention to provide such polymer additive. More specifically, it is an object of the present invention to provide such an additive in the form of a vinylidene chloride polymer powder that can be dispersed in a polyol used to prepare the polyurethane foam materials.

A more general object of the present invention is to provide a vinylidene chloride polymer powder which can be dispersed in a nonsolvent for vinylidene chloride polymers and thereafter used to prepare polymeric materials having enhanced physical properties.

SUMMARY OF THE INVENTION

In one aspect, the present invention resides in a composition of matter for use in the preparation of polymeric materials having enhanced physical properties comprising (A) a nonsolvent for vinylidene chloride polymers, such as a polyol used in the preparation of polyurethane materials, and (B) a crosslinked vinylidene chloride polymer microgel powder which is dispersible in the nonsolvent. The powder employed is obtained by a method comprising the steps of (I) preparing a microgel latex by emulsion polymerizing (a) about 50 to about 90 parts by weight of vinylidene chloride, (b) about 10 to about 50 parts by weight of a copolymerizable ethylenically unsaturated comonomer, and (c) a minor amount of a copolymerizable crosslinking polyfunctional comonomer, wherein the microgels in the resulting latex have a gel content of about 25 to 99 percent and a second order transition temperature of at least about 30° C., and (II) recovering the microgel powder from the latex. The microgels prior to recovery have a diameter less than about 1 micron.

In another aspect, the present invention resides in such a composition of matter wherein the method for obtaining the powder further comprises, between steps (I) and (II), the steps of adding to the latex an effective degradation-reducing amount up to about 20 weight percent of a sequentially polymerizable monomer mixture comprising an ethylenically unsaturated nonvinylidene chloride monomer, and polymerizing the monomer mixture.

In a further aspect, the present invention resides in a polyurethane material prepared from such a composition of matter, e.g., wherein the nonsolvent comprises a polyol.

In a still further aspect, the present invention resides in an improvement in a method of forming a polyurethane material by reacting a polyfunctional isocyanate with an active-hydrogen-containing material, wherein the improvement is characterized by including in the reactant mixture a crosslinked vinylidene chloride polymer microgel powder obtained by the method hereinbefore described.

DETAILED DESCRIPTION OF THE INVENTION

The crosslinked vinylidene chloride polymer microgel powders of the present invention are recovered from latices which have been prepared by polymerization in an aqueous emulsion according to processes well known in the art. Preferably, the polymerization is carried out by essentially continuous, carefully controlled addition of the requisite polymerization constituents (including polymerization initiator systems if desired) to the aqueous medium.

Generally, it is preferred to start the polymerization by adding a small amount of monomeric material to the aqueous medium and then adding the desired polymerization initiator to form a polymeric seed latex to aid in the control of particle size. The aqueous medium in which the seed latex is formed will contain the necessary surfactants to form the emulsion and will generally be adjusted to the desired pH value, as is well known in the art. Following the formation of the seed latex, the remaining amount of monomeric material is continuously added under carefully controlled conditions to the aqueous medium.

In accordance with the present invention, the microgel latices are prepared by emulsion polymerizing about 50 to about 90, preferably about 50 to about 80, parts by weight of vinylidene chloride; about 10 to about 50, preferably about 20 to about 50, parts by weight of a copolymerizable ethylenically unsaturated comonomer; and from about 1 to about 10, preferably about 2 to about 6, parts by weight of a copolymerizable crosslinking polyfunctional comonomer. The resulting microgels should have a second order transition temperature of at least about 30° C., preferably at least about 35° C.

Exemplary copolymerizable ethylenically unsaturated comonomers which can be utilized in the present invention include the alkyl esters of acrylic and methacrylic acids such as methyl acrylate and methyl methacrylate; nitriles of ethylenically unsaturated carboxylic acids such as acrylonitrile and methacrylonitrile; ethylenically unsaturated carboxylic acids such as acrylic acid and methacrylic acid; and other ethylenically unsaturated monomers known to polymerize with vinylidene chloride.

Exemplary copolymerizable crosslinking polyfunctional comonomers which can be employed include 1,3-butylene glycol diacrylate, 1,4-butane diol diacrylate, allyl acrylate, vinyl acrylate, 1,3-butylene glycol dimethacrylate, 1,4-butane diol dimethacrylate, allyl methacrylate, vinyl methacrylate, and the like. The actual amount of polyfunctional comonomer needed for dispersibility will depend upon the crosslinking efficiency of the particular polyfunctional comonomer used, as well as the ethylenically unsaturated comonomer which is polymerized therewith. Generally, it can be stated that sufficient polyfunctional comonomer should be used to provide a gel content of about 25 to about 95, preferably about 50 to about 99, percent in the resulting vinylidene chloride polymer microgel. Typically, the amount of crosslinking monomer needed to obtain such gel contents will range from about 1 to about 10, preferably from about 2 to about 6, parts by weight.

As used herein, "percent gel" is determined by the following technique: Add 36.6 ml tetrahydrofuran (THF) and a predetermined amount ($W_S$), usually about 0.7–1.2 g, of the desired microgel to a 50 ml centrifuge tube. Cap the tube and then agitate it overnight (usually about 12 hours) on a horizontal agitator. Thereafter, centrifuge the tube at 19,000 rpm for about 1 hour at 5° C. Extract 10 ml of the resulting supernatant liquid and place it into an evaporating dish. Evaporate most of the THF over low heat and then complete the drying by placing the dish in an oven for about 1 hour at 40° C. Finally, determine the weight ($W_F$) of resin in the dish and calculate gel content by the following formula:

$$\text{Percent Gel} = 100 \times \left[ 1 - \frac{3.66 \, W_F}{W_S} \right]$$

In view of the fact that amine catalysts are typically used in the preparation of polyurethane foam materials to control the rate of urea and urethane reactions and that the urethane reactions are significantly exothermic, it will be appreciated by workers in the art that the crosslinked vinylidene chloride polymer microgel powders recovered from the latices described hereinbefore could have a tendency to degrade and produce hydrogen chloride when used in such applications. The accelerated evolution of hydrogen chloride caused by such degradation could not only result in discoloration of the vinylidene chloride polymer and the resultant polyurethane foam material, but could also alter the kinetics of the urethane reaction.

It has been found that a moderate decrease in the propensity of the microgel powders to discolor when exposed to the conditions of the polyurethane foam reaction and similar deleterious environments can be achieved by sequentially polymerizing such microgels with a monomer mixture comprising an ethylenically unsaturated non-vinylidene chloride monomer. Without intending to be bound by such theory, it is believed that the sequential polymerization provides a thin cap on the microgels which protects them from the amine catalyst, thereby reducing the rate of decomposition.

The sequential polymerization can be carried out in a conventional manner by adding an effective degradation-reducing amount up to about 20 percent by weight of the microgels, preferably from about 5 to about 10 percent by weight, of the desired monomer mixture (including emulsifiers and initiators as needed) to the microgel latex and subjecting the monomer mixture to polymerization conditions. In a preferred mode, the desired monomer mixture for sequential polymerization is not added to the microgel latex until it is certain that essentially all of the residual vinylidene chloride monomer has been depleted. Depletion of residual vinylidene chloride monomer can be accomplished, for example, by adding an additional amount of initiator or a minor amount of methyl acrylate to the polymerization vessel subsequent to the apparent completion of the microgel reaction, but prior to the addition of the sequentially polymerizable monomer mixture. In this manner, the possibility of including vinylidene chloride in the resultant non-vinylidene chloride polymer "cap" (which term will be occasionally used herein for convenience only) will be reduced.

In order to provide adequate dispersibility for purposes of this invention, the non-vinylidene chloride polymer "cap" which results from this sequential polymerization should either be uncrosslinked and have a second order transition temperature greater than about 60° C., preferably greater than about 65° C., or it should be crosslinked. If the "cap" is crosslinked, i.e., by copolymerizing a minor amount of a crosslinking polyfunctional comonomer with the desired ethylenically unsaturated non-vinylidene chloride monomer or monomers, the second order transition temperature requirement is not as critical, though values within the aforementioned range are preferred.

Exemplary ethylenically unsaturated non-vinylidene chloride monomers which can be used in the sequential polymerization reaction to prepare the "cap" polymer include the alkyl esters of methacrylic acid such as methyl methacrylate; the vinyl aromatic monomers such as styrene and vinyl toluene; and other sequentially polymerizable monomers, i.e., those which are compatible with the vinylidene chloride microgels and which are capable of producing a "cap" satisfying the aforementioned criteria.

Exemplary copolymerizable crosslinking polyfunctional comonomers which can be sequentially polymerized with the ethylenically unsaturated non-vinylidene chloride monomers include 1,3-butylene glycol diacrylate, 1,4-butane diol diacrylate, allyl acrylate, vinyl acrylate, 1,3-butylene glycol dimethacrylate, 1,4-butane diol dimethacrylate, allyl methacrylate, vinyl methacrylate, and the like. In a manner like that described for the microgels, the amount of crosslinking monomer required for dispersibility will depend upon the efficiency of the particular crosslinking monomer chosen, as well as the ethylenically unsaturated non-vinylidene chloride monomer or monomers with which it is polymerized. Generally the amount of crosslinking monomer used, if any, will be less than about 6 percent of the weight of the sequentially polymerizable monomer mixture.

The diameter of the microgels in the resulting latex, which includes those microgels which have been "capped" by sequential polymerization as well as those which have not been "capped", should be less than about 1 micron. Preferably, the mean microgel diameter is in the range of about 0.05 to 0.5 micron, most preferably in the range of about 0.1 to 0.3 micron, with substantially all of the microgels having a diameter within that range. The preferred ranges are especially applicable if the powders obtained therefrom are to be used in the preparation of polyurethane foam materials. The larger latex particles will produce less discoloration in polyurethane foam materials, but smaller particles have longer dispersion stability in the polyol starting material and also provide better load-bearing properties in the foam material. Accordingly, the aforementioned preferred range represents those sizes which will give the best overall balance of properties when used in the preparation of polyurethane foam material.

The crosslinked vinylidene chloride polymer microgel powders of the present invention are recovered from the microgel latices by conventional techniques, preferably by coagulating the latex and then washing and drying the coagulum or by spray drying the latex to produce a fine powder. The optimum temperature for coagulation will vary depending upon the type and amount of comonomer employed in preparing the microgels and particularly upon the second order transition temperature of the so-formed microgels. Generally, the coagulation temperature will be in the range of about 50° to 95° C., preferably from about 50° to 70° C.

It is necessary that the vinylidene chloride polymer powders of the present invention be dispersible in nonsolvents for vinylidene chloride polymers. For purposes of the present invention, "dispersibility" is measured under the following conditions: 20 weight percent of the desired powder is mixed with a polyol having a room temperature viscosity of about 900–1000 cps, (such as the polyol obtainable from The Dow Chemical Company under the trademark VORANOL® 4701) and the mixture is passed once through a Gifford-Wood colloid mill operating at 10,000 rpm with a gap setting 0.004 in and then twice through a Gaulin homogenizer operating at 5000 psi. Under such conditions, substantially all of a powder suitable for use in the present invention will break down in the polyol and regenerate the original latex particles. Essentially all of the powder particles which do not break down to the latex particle size, if any, should be of a size less than about 100 microns.

As used herein, "nonsolvents" for vinylidene chloride polymers" is intended to be descriptive of liquid organic reactants which are used in the preparation of polymeric materials. In particular, it is intended to include polyols, which are used in the preparation of polyurethane materials; dihydroxy alcohols, which are used in the preparation of polyester resins; and the like. In all cases, the crosslinked vinylidene chloride polymer microgel powders of the present invention are suitably employed to render the resulting polymeric materials more resistant to ignition and burning while generally retaining and/or improving other beneficial physical properties.

Conventional vinylidene chloride polymers can, in some instances, be blended directly with a suitable thermoplastic polymer to produce a satisfactory product. However, the microgel powders according the present invention are advantageously incorporated into polymeric materials by dispersing the powder in the desired nonsolvent liquid reactant with moderate shear and thereafter carrying out the contemplated polymerization reaction. It will be appreciated that the latter method is critically employed in the preparation of many foamed polymeric materials, particularly in the preparation of foamed polyurethane materials.

In accordance with the present invention, the use of the microgel powders in the preparation of polymeric materials having enhanced physical properties will now be described by way of example with respect to the preparation of polyurethane materials—which may or may not be foamed. Polyurethane materials are prepared by the methods well known in the art by reacting a polyfunctional isocyanate with a polyfunctional chemical compound having an active hydrogen in its structure such as polyester, polyesteramide or polyether or mixture of two or more of such materials. The latter component is generally referred to as the "active-hydrogen-containing material" and is typically sufficiently liquid to permit mixing and reaction with the polyfunctional isocyanate in producing the polyurethane. The active-hydrogen-containing materials conventionally used contain hydroxyl groups as the radicals having the active hydrogen and thus are generally termed "polyols". The preparation of such materials is shown, for example, in U.S. Pat. No. 2,888,409 and in the patents referred to therein. In addition, other hydroxyl-capped polymers useful as the polyol in preparing polyurethane resins include polyformals as described, for example, in U.S. Pat. No. 3,055,871 to Heffler et al.; the hydroxyl-terminated lactone polyesters described in U.S. Pat. No. 3,051,687 to Young et al.; the alkylene oxide adducts of the alkyl alcohol-styrene polymers as described in U.S. Pat. No. 2,965,615 to Tess, et cetera. For reasons of commercial availability and cost, it is conventional to use polyethers having hydroxyl-terminated chains in the preparation of polyurethane foams and either such polyethers or hydroxyl-terminated polyesters in preparing vulcanizable gum, adhesive, films, et cetera. The polyurethane end products may occasionally be crosslinked to some extent by including with the polyol (which is generally di- or polyfunctional) a small amount of polyfunctional crosslinking agent.

The active-hydrogen-containing materials suitable for use in the preparation of polyurethane materials of the present invention are any of those known in the art and (1) which form stable and uniform dispersions with the crosslinked vinylidene chloride polymer microgel powders, which dispersions are preferably dilutable without the formation of undesirable precipitates with other components used to form the polyurethane; (2) which are liquids, at least at the temperatures used for preparing the dispersions and for the reaction with the polyisocyanate; and (3) which have at least two radicals reactive with the isocyanato radicals of the polyisocyanate so as to form a polymeric reaction product. The preferred active-hydrogen-containing materials are the polyols having the aforementioned properties.

The polyols employed can have hydroxyl numbers which vary over a wide range. The exact polyol employed depends, among other things, upon the end use of the polyurethane product to be produced. For example, in the case of foamed reaction products, the molecular weight of the hydroxyl number is selected preferably to result in flexible, semiflexible, or rigid foams. In such applications, the polyols preferably possess a hydroxyl number of from about 200 to about 1000 when employed in rigid foam formulations, from about 50 to about 150 for semiflexible foams, and from about 20 to about 70 or more when employed in flexible foam formations. Such limits are not intended to be restrictive, but are merely illustrative of the large number of combinations possible.

As referred to earlier, the vinylidene chloride polymer microgel powders are advantageously incorporated into polyurethanes by first forming a dispersion of the powder in the desired polyol. Generally, the resulting dispersions should have a viscosity low enough to permit ready mixing with additional quantities of polyol used, if any, and with the other components of the polyurethane reaction. Furthermore, the resulting dispersions should be at least sufficiently stable to prevent sedimentation during the period required to carry out the polyurethane reaction. If the dispersions are to be prepared and then stored prior to use, it will be appreciated that they should be stable for a much longer period of time, e.g., usually at least about 3 months. Generally, the dispersions of the present invention demonstrate such long-term stability requirements, particularly those dispersions containing vinylidene chloride polymer microgel powder particles having a size within the preferred range described hereinbefore.

The polymer powder/polyol dispersions of the present invention may be used in place of the polyols of the prior art in any of the processes used in preparing polyurethanes. Thus, the dispersions may be used in the prepolymer process, the quasi-prepolymer process, or the one-shot process. The polyurethanes may be further reacted with epoxy resins, cured with sulfur, peroxides or other curing agents, or otherwise reacted or modified as known to those skilled in the art.

Referring now to the use of the present vinylidene chloride polymer microgel powders in the preparation of polymeric materials in general, the amount of powder which will be incorporated into a desired polymeric material will depend upon the particular vinylidene chloride polymer microgel powder used and upon the degree to which it is desired to enhance flame-retardancy and/or other beneficial physical properties in the resulting polymeric material, as well as other technical and economic considerations known and understood by those skilled in the art. In accordance with the present invention, the resulting polymeric materials will contain an amount of the microgel powder which effectively enhances the physical properties thereof. This amount generally ranges from about 2 to about 50 percent, preferably from about 3 to about 30 percent of the weight of the polymeric material. Accordingly, the amount of microgel powder dispersed in the nonsolvent will be adjusted to produce such results.

It will be understood that the resulting polymeric materials may be prepared so at to contain further modifying ingredients such as heat and light stabilizers, pigments, conventional flame-retardant synergists, and so forth, as necessary or desired for particular applications, without departing from the scope of the present invention.

With respect to polyurethane foam materials in particular, surfactants or emulsifiers are frequently used to provide the necessary cell formation and growth for optimum processability. However, polyurethane foam materials prepared from polyols containing crosslinked vinylidene chloride polymer microgel powders in accordance with the present invention do not generally require the use of such surfactants or emulsifiers, as will be readily appreciated and understood by those familiar with the performance of polymer/polyol systems which have heretofore been used in the art. Nevertheless, such surfactants or emulsifiers may be advantageously employed, especially when using powders prepared from the larger-sized microgels inasmuch as such microgels have a reduced tendency to improve cell size in the polyurethane foam material. A user can, with only minimal experimentation, determine when such a surfactant or emulsifier will provide improved results in the practice of this invention.

As referred to earlier, the microgel powders of the present invention can be moderately stabilized in an environment of high temperature and/or basic compounds, e.g., that environment encountered in preparing polyurethane foam materials, by sequential polymerization with non-vinylidene chloride monomers. Alternatively, or in addition thereto, conventional stabilizers for vinylidene chloride polymers, such as the hindered phenolic antioxidants and the like, may also be employed. It has been found that only marginal improvement in the color of a polyurethane foam material is achieved by using certain epoxy stabilizers, such as DER®331 epoxy resin obtained from The Dow Chemical Company. Accordingly, it may be necessary for a user to determine by simple preliminary experimentation those stabilizers which will be suitably employed with the vinylidene chloride polymer microgel powders used in the present invention. Suitable stabilizers are preferably used by adding them to the aqueous medium prior to or during the emulsion polymerization of the vinylidene chloride polymer microgels, according to methods which are generally known in the art.

The following specific examples illustrate the invention but are not to be taken as limiting its scope. Parts and percentages are by weight unless otherwise indicated.

EXAMPLE 1

In accordance with the present invention, the following recipe and technique were used to prepare a crosslinked vinylidene chloride polymer microgel powder which is dispersible in polyols and other nonsolvents for vinylidene chloride polymers:

INITIAL WATER PHASE 1800 g water
15 g AEROSOL MA emulsifier
pH adjusted to 3.5 with glacial acetic acid

REDUCING AGENT STREAM 9.75 g HYDROSULFITE AWC reducing agent in 1000 g aqueous solution
Feed rate = 10 g/hr

INITIATOR STREAM 5.0 g of 83% t-butyl hydroperoxide (TBHP) in 1000 g aqueous solution
Feed rate = 10 g/hr

MONOMER FOR SEED LATEX REACTION 450 g vinylidene chloride (VDC)
50 g methyl methacrylate (MMA)
10 g 1,3-butylene glycol dimethacrylate (BGDM)
Used 150 g in seed latex reaction

AQUEOUS EMULSIFIER STREAM 236 g of 45% DOWFAX 2A1 emulsifier in 1600 g of aqueous solution
Used 800 g in 20 hours (Feed rate = 40 g/hr)

MONOMER MIX 800 g MMA (20 parts by weight)
3200 g VDC (80 parts by weight)
80 g BGDM (2 parts by weight)
Used 2500 g in 20 hours (Feed rate = 125 g/hr)

FINISHING

Fed Reducing Agent and Initiator Streams at 10 g/hr for one hour

The initial water phase was poured into a two-gallon Pfaudler reactor and the reactor pressure tested for leaks at 35 psi with nitrogen. The nitrogen was then released. The reactor was placed under a vacuum of 25 inches Hg and the reactor was heated to a temperature of 40° C. The vacuum was then shut off and 150 g of the seed latex monomer was added to the reactor while agitating the contents thereof. Immediately thereafter, pumping of the reducing agent and initiator streams were begun at 10 g/hr each. The seed latex reaction was completed in approximately one hour as indicated by a drop in pressure of 2 psi from the maximum pressure attained during the seed latex reaction. When the pressure reached such point, introduction of the monomer mix at 125 g/hr and the aqueous emulsifier stream at 40 g/hr were begun and continued for 20 hours, while maintaining the flow of the reducing agent and initiator streams at 10 g/hr each. After the monomer and emulsifier streams were shut off, the reducing agent and initiator streams were pumped at 10 g/hr for one additional hour to complete the reaction. The resulting microgels had a gel content above 25% and a second order transition temperature of about 35° C.

The microgel powder was recovered from the latex by conventional alum coagulation techniques and then air dried. 200 g of the dry microgel powder was mixed into 800 G of polyol with a spatula and then passed through a colloid mill to break up the powder particles. When adequately mixed, microscopy revealed that many of the original microgel particles were present. Some aggregates of particles were observed, but it was not apparent that the particles in the aggregates were sintered together, but may have just gathered together during microscopy. All of the aggregates were less than 100 microns in cross section.

By way of comparison, a conventionally prepared non-crosslinked copolymer containing essentially the same amount of MMA and VDC and coagulated in the same procedure had many solid particles of a size greater than 1000 microns following the same degree of shearing in the polyol, and was further characterized by a gel content of 0% and a second order transition temperature of about 35° C. (hereinafter referred to as Comparative Sample No. 3).

EXAMPLE 2

Various polyurethane foam samples were prepared by first mixing the desired polymeric additive with the following ingredients:

| Ingredient | Amount (grams) |
|---|---|
| VORANOL ® 4701 polyol | 200 |
| Silicone surfactant | 2 |
| 70% solution of bis(N,N-dimethylaminoethyl)- ether in dipropylene glycol | 0.15 |
| 50% solution of stannous octoate in di(2-ethylhexyl)phthalate | 0.6 |
| 33% solution of triethylenediamine in dipropylene glycol | 0.8 |
| Diethanolamine | 2.4 |

-continued

| Ingredient | Amount (grams) |
|---|---|
| Water | 5.2 |

To the above, 70.4 g of toluene diisocyanate (TDI) were added, with blending. As soon as foaming had started, the mixture was poured into a container and permitted to foam over a period of 5 minutes. The resulting foamed polyurethane material was then heated in a 120° C. oven for a period of 10 minutes, compressed to open the cells, and reheated for a period of 15 additional minutes at 120° C.

The following Table I sets forth the physical properties of such foam samples containing varying amounts and types of polymeric additives:

TABLE I

| Sample Identification | Wt. % Used* | Tear Strength lb/in | 25% Compression lb/4in$^2$ | 65% Compression lb/4in$^2$ |
|---|---|---|---|---|
| For Comparison | | | | |
| 1. Control (no additive) | 0.0 | 1.0 | 1.0 | 2.0 |
| 2. Styrene/acrylonitrile copolymer (Niax-34-28) | 10 | 1.8 | 1.3 | 3.0 |
| 3. Non-crosslinked Emulsion Copolymer of 80 wt % VDC and 20 wt % MMA | 15 | 1.23 | 1.03 | 2.93 |
| The Invention | | | | |
| 4. Microgel powder of Example 1 | 15 | 1.96 | 1.47 | 4.83 |

*Based on the weight of the initial ingredients, i.e., prior to the addition of TDI.

The data set forth in Table I illustrate the enhanced load-bearing properties of the polyurethane material obtained by utilizing the microgel powder/polyol dispersion of the present invention. In addition, that polyurethane foam material passed the Department of Transportation Motor Vehicle Safety Standard No. 302, thereby demonstrating the flame-retardancy of that material.

Similar good results are obtained utilizing any of the crosslinked vinylidene chloride polymer microgel powder dispersions of the present invention.

What is claimed is:

1. In a method of forming a polyurethane material by reacting a polyfunctional isocyanate with an active-hydrogen-containing material, the improvement characterized by including in the reactant mixture a crosslinked vinylidene chloride polymer microgel powder obtained by a method comprising the steps of
   (I) preparing a microgel latex by emulsion polymerizing (a) about 50 to about 90 parts by weight of vinylidene chloride, (b) about 10 to about 50 parts by weight of a copolymerizable ethylenically unsaturated comonomer, and (c) a minor amount of a copolymerizable crosslinking polyfunctional comonomer, wherein the microgels in the resulting latex have a gel content of about 25 to 99 percent and a second order transition temperature of at least about 30° C., and
   (II) recovering the microgel powder from the latex; wherein the microgels prior to recovery have a diameter less than about 1 micron.

2. A method according to claim 1 wherein the gel content of the microgels ranges from about 50 to about 99 percent.

3. A polyurethane material prepared according to the method of claim 1.

* * * * *